(12) United States Patent
Qi et al.

(10) Patent No.: US 10,191,792 B2
(45) Date of Patent: Jan. 29, 2019

(54) APPLICATION ABNORMALITY DETECTION

(71) Applicant: International Business Machines Corporation, Armonk, NY (US)

(72) Inventors: Yao Dong Qi, Beijing (CN); Lanjun Wang, Beijing (CN); Hai Shan Wu, Beijing (CN); Di Dx Xu, Beijing (CN); Yi Bj Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 15/062,028

(22) Filed: Mar. 4, 2016

(65) Prior Publication Data

US 2017/0255505 A1 Sep. 7, 2017

(51) Int. Cl.
*G06F 11/00* (2006.01)
*G06F 11/07* (2006.01)

(52) U.S. Cl.
CPC .................... *G06F 11/0754* (2013.01)

(58) Field of Classification Search
CPC .......... G06F 11/3466; G06F 11/3409; G06F 2217/78; G06F 11/3062; G06F 9/5094
See application file for complete search history.

(56) References Cited

U.S. PATENT DOCUMENTS

| | | | |
|---|---|---|---|
| 8,015,276 B2 | 9/2011 | Hoeflin | |
| 8,019,886 B2 * | 9/2011 | Harrang | H04L 45/00 709/203 |
| 8,387,059 B2 * | 2/2013 | Chang | G06F 9/5083 718/104 |
| 8,423,168 B2 * | 4/2013 | Nonaka | G05B 19/4184 700/101 |
| 8,457,928 B2 | 6/2013 | Dang | |
| 8,499,074 B2 * | 7/2013 | Aust | H04L 67/1097 370/228 |
| 8,635,498 B2 | 1/2014 | Kahana | |
| 9,124,505 B2 * | 9/2015 | Luo | H04L 47/12 |
| 9,251,032 B2 * | 2/2016 | Kanemasa | G06F 11/3452 |
| 9,317,330 B2 * | 4/2016 | Duttagupta | G06F 9/5011 |
| 9,372,523 B2 * | 6/2016 | Furukawa | G06F 11/3409 |
| 9,641,452 B2 * | 5/2017 | Lu | H04L 47/788 |

(Continued)

OTHER PUBLICATIONS

Cherkasova, Ludmila et al., Automated Anomaly Detection and Performance Modeling of Enterprise Applications, ACM Transactions on Computer Systems (TOCS), vol. 27, Issue 3, Article No. 6, Nov. 2009, pp. 1-30.

*Primary Examiner* — Loan L. T. Truong
(74) *Attorney, Agent, or Firm* — Vazken Alexanian; Otterstedt, Ellenbogen & Kammer, LLP (57) ABSTRACT

A method of operating a computer system including collecting, from the computer system, data indicative of variations in throughput and response time over a period of time, calculating processing power of the computer system over the period of time, recording a maximal power, calculating a standard deviation of the response time (RT-StdDev), recording the standard deviation of the response time corresponding to a time of the maximal power (RT-StdDev-MaxPower), and generating a notification that the computer system is in a bottleneck state using a comparison of a current processing power to the maximal power and a comparison of the RT-StdDev to the RT-StdDevMaxPower.

13 Claims, 10 Drawing Sheets

(56) References Cited

U.S. PATENT DOCUMENTS

| | | | |
|---|---|---|---|
| 9,703,351 B2* | 7/2017 | Carlson | G06F 1/32 |
| 9,760,352 B2* | 9/2017 | Nakashima | G06F 8/443 |
| 2009/0171646 A1* | 7/2009 | Silbermintz | G06F 11/3616 |
| | | | 703/16 |
| 2009/0177642 A1* | 7/2009 | Chung | G06F 11/3419 |
| 2009/0300173 A1* | 12/2009 | Bakman | G06F 11/008 |
| | | | 709/224 |
| 2011/0172963 A1* | 7/2011 | Gu | G06F 11/3495 |
| | | | 702/182 |
| 2011/0289330 A1* | 11/2011 | Gao | G06F 1/3203 |
| | | | 713/320 |
| 2012/0208672 A1* | 8/2012 | Sujan | B60W 10/02 |
| | | | 477/5 |
| 2013/0110423 A1* | 5/2013 | Zimmermann | H04W 52/0254 |
| | | | 702/61 |
| 2013/0158950 A1 | 6/2013 | Cohen | |
| 2013/0198594 A1* | 8/2013 | Catthoor | H03M 13/256 |
| | | | 714/792 |
| 2013/0308457 A1* | 11/2013 | Luo | H04L 47/12 |
| | | | 370/235 |
| 2014/0281726 A1 | 9/2014 | Garrett | |

* cited by examiner

APPLICATION ABNORMALITY DETECTION

BACKGROUND

The present disclosure relates to Application Performance Management/Monitoring (APM), and more particularly to the application of APM in abnormality detection.

Typical application abnormality detection solutions are threshold based. Threshold settings can be difficult to configure. Threshold based application abnormality detection can be resource based or experience based. Resource based thresholds can include target CPU usage, target memory utilization, target threshold pool utilization, etc. Experience based thresholds can include target response time, target throughput, target packet drop rate, etc. Moreover, expert knowledge is needed to determine a threshold for dynamic workloads.

BRIEF SUMMARY

According to an embodiment of the present invention, a method of operating a computer system includes collecting, from the computer system, data indicative of variations in throughput and response time over a period of time, calculating processing power of the computer system over the period of time, recording a maximal power, calculating a standard deviation of the response time (RT-StdDev), recording the standard deviation of the response time corresponding to a time of the maximal power (RT-StdDev-MaxPower), and generating a notification that the computer system is in a bottleneck state using a comparison of a current processing power to the maximal power and a comparison of the RT-StdDev to the RT-StdDevMaxPower.

According to an embodiment of the present invention, a computer system includes a load driver generating a workload, an application module embodied in computer executable code executed by a processor of the computer system, an agent collecting throughput and response time data about the computer system executing the application module, and an abnormality detection system detecting an abnormal state of the computer system executing the application module, wherein the abnormality detection system receives the throughput and response time data from the agent and determines a notification by calculating an average throughput, an average response time, a current power, and a filtered response time.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an embodiment of the present invention, a system executing an application can be described by the properties of response time and throughput. In at least one embodiment of the present invention, the response time and throughout of the system are used to automatically determine that the system has entered, or about to enter, an abnormal status (see for example, FIG. 10). One technical effect of the present invention is that there is no need for a set threshold for detecting an abnormal status of the system executing the application. In a typical system, a threshold for abnormality detection is set by a user, relying on his or her experience.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
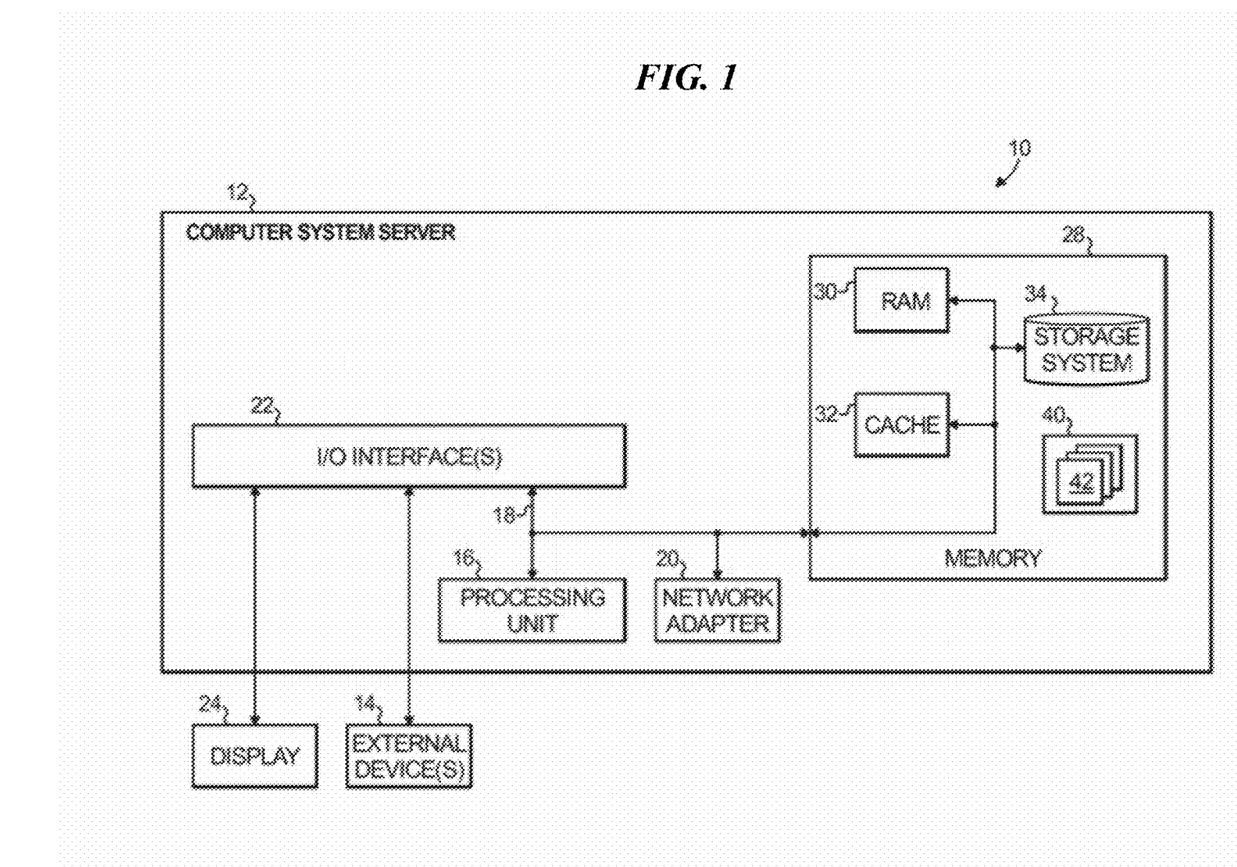
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
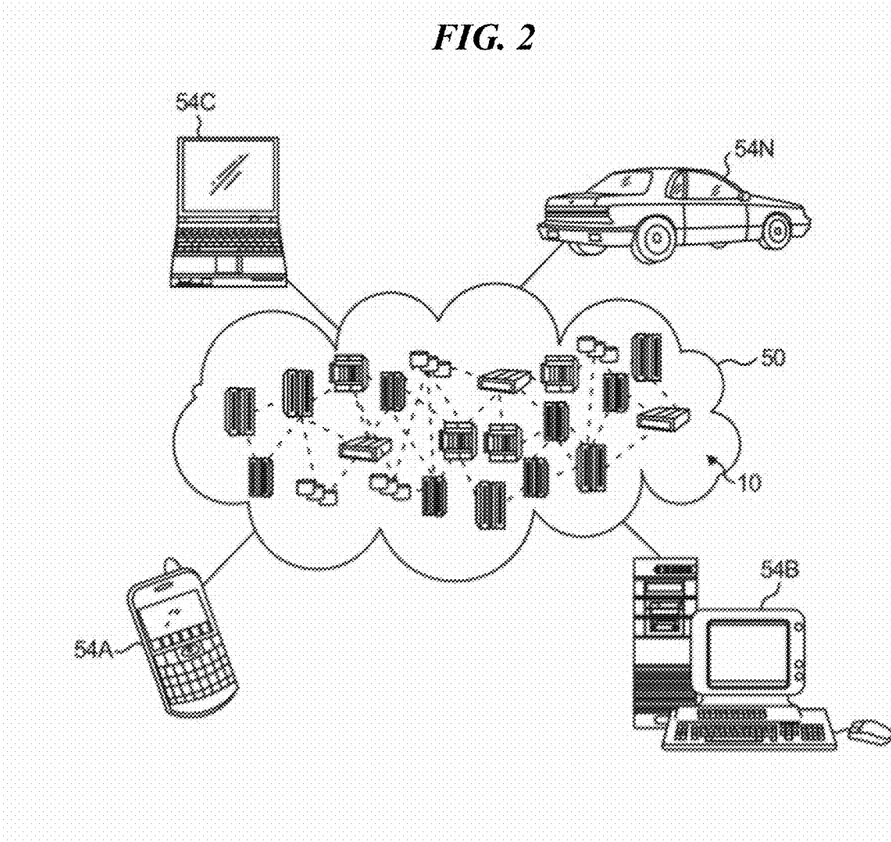
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
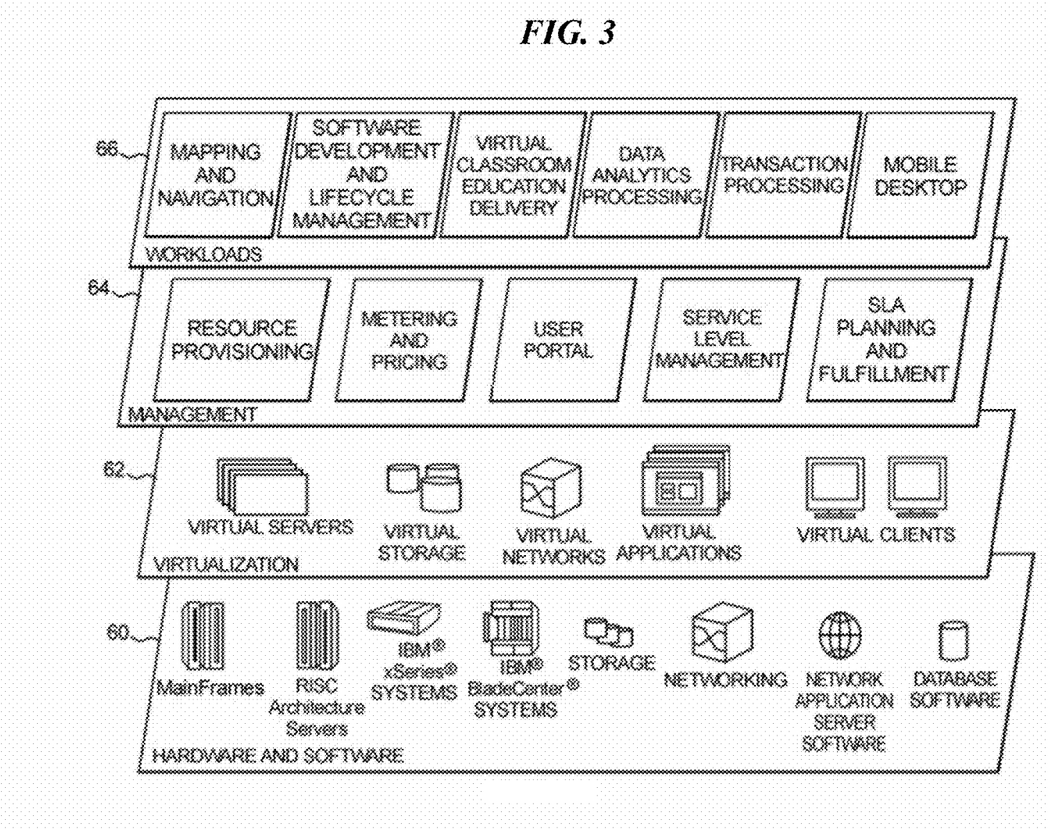
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
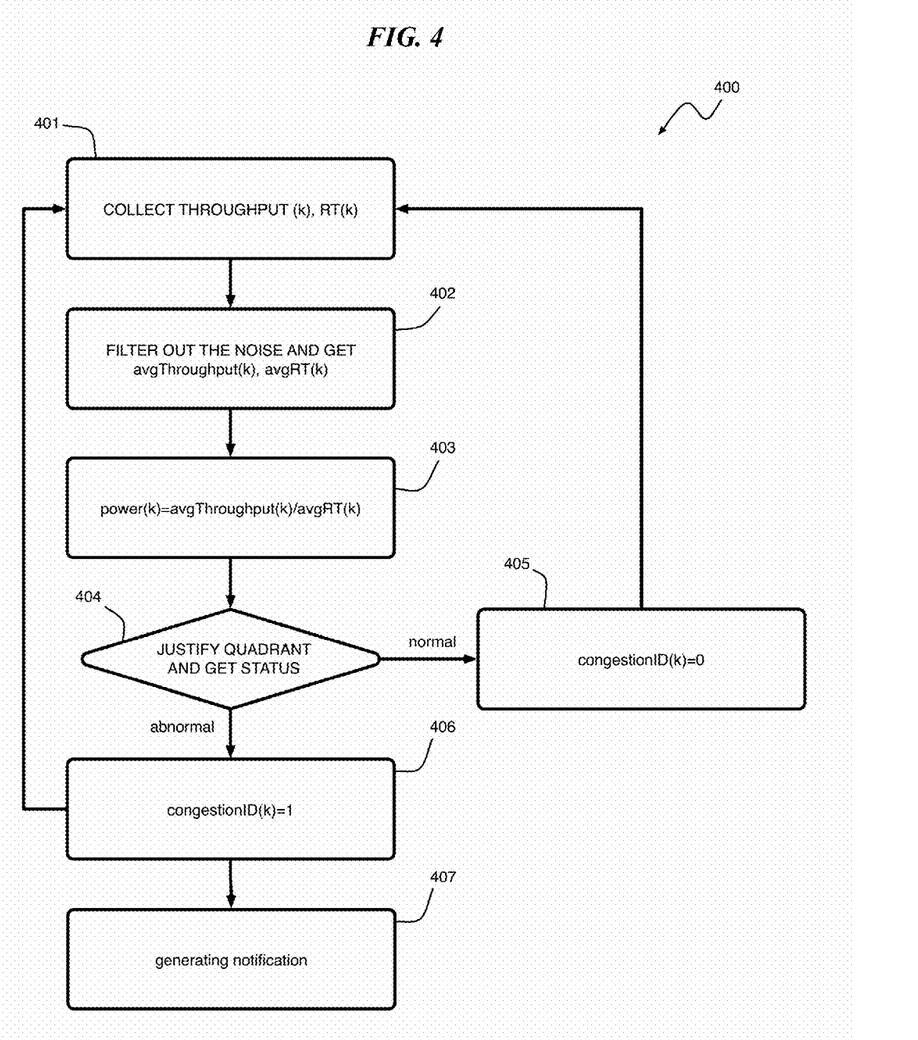
FIG. 4 is a flow diagram of a method (algorithm) according to an embodiment of the present invention.

FIG. 4 is a flow diagram of a method (algorithm) 400 of operating a system to detect an abnormal condition according to an embodiment of the present invention. According to an embodiment of the present invention, time is divided into slots. Each of the time slot includes a set duration, for example, hundreds to thousands of milliseconds, and preferably between about 100-500 milliseconds. Other intervals can be selected depending on, for example, the workload associated with sampling the time slots (i.e., shorter time slots increase the workload on the system). According to method 400, the system samples throughput and response time of an application, k, over a plurality of time slots 401. According to an embodiment of the present invention, response time is a total amount of time the application, k, needs to respond to a request for service or transaction, such as a memory fetch, database query, or loading a web page.

At block 402, noise is filtered from the throughput and response time data by calculating an average throughput (avgThroughput(k)) and an average response time (avgRT(k)) of the application over time (e.g., over about 1 second to 5 minutes and preferably between about 10 seconds to 1 minute). In at least one embodiment of the present invention, noise is filtered at block 402 using one or more filters, such as a smoothing filter (e.g., sliding window least square fitting, rough penalty smoothing method, kernel smoothing method, etc.). In at least one embodiment of the present invention, the filtered response time is determined using a standard deviation (StdDev) filter, e.g., by replacing every value (i.e., each response time) by a standard deviation of the values in a range r (e.g., within some neighborhood including a predetermined number of time slots).

At block 403, the application's power and a filtered response time (i.e., RT-StdDev(k)) are determined.

It should be understood that while embodiments of the present invention are described in terms of standard deviation, the various values can be determined in other terms, such as standard variance.

Figure 5:
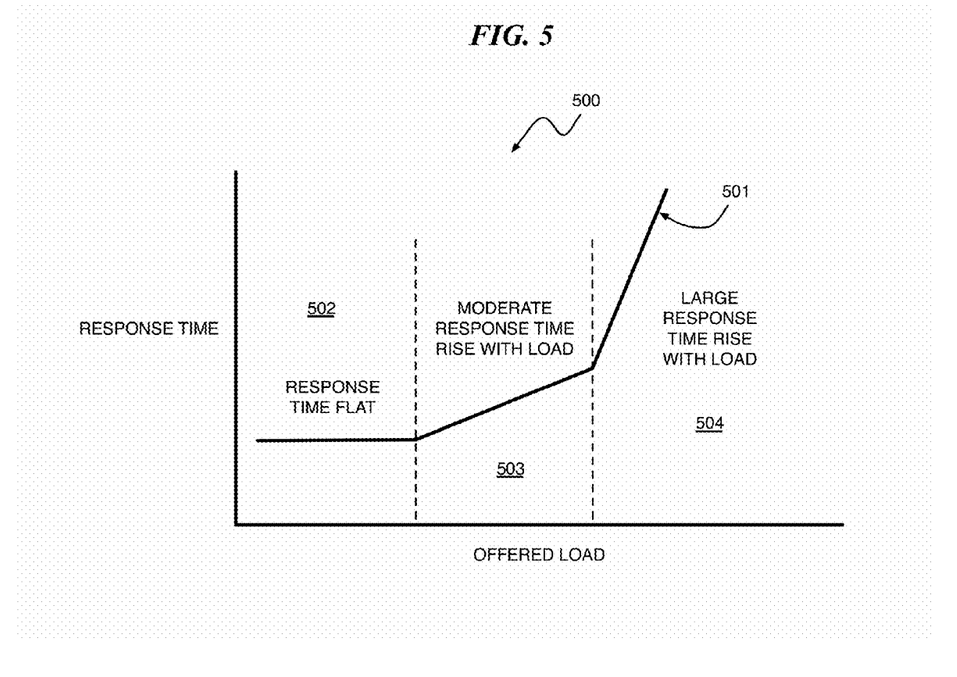
FIG. 5 is a graph showing an exemplary application characteristic according to an embodiment of the present invention.

FIG. 5 is a graph 500 showing a plot 501 of an exemplary application characteristic (i.e., response time versus offered load) according to an embodiment of the present invention. In the example, the response time of an application is flat at low load levels 502, e.g., wherein the load is less than the application's bandwidth (i.e., load<bandwidth). The response time of the application rises with moderate load levels 503, and greatly increases at high load 504, where the bandwidth of the application is overtaken by the demand of the current load level. It should be understood that the plot 501 is intended to be exemplary, and that other applications and systems can have different responses to increasing load.

Figure 6:
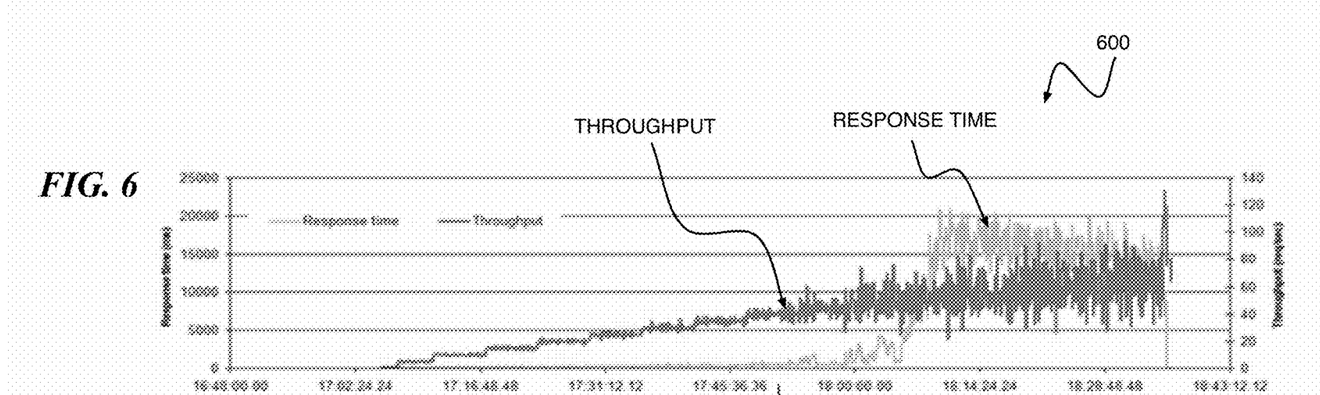
FIG. 6 shows a graph of response time and throughput according to an embodiment of the present invention.
Figure 7:
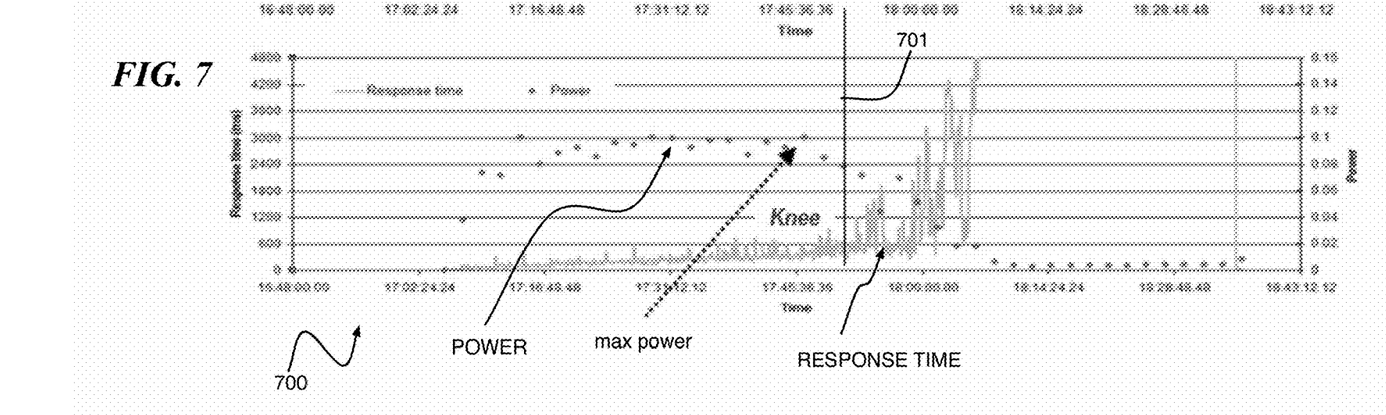
FIG. 7 shows a graph of the response time of FIG. 4 and power according to an embodiment of the present invention.

FIG. 6 is a graph 600 of an application's response time, plotted against throughput, and FIG. 7 is a graph 700 of the application's response time, plotted against power. According to an embodiment of the present invention, power is defined as follows:

$$\text{Power}(k) = \text{Throughput}(k)/\text{RT}(k) \qquad \text{Eq. 1}$$

According to equation 1, an application maximizes power at about the point 701, where system performance has started to degrade. As such, embodiments of the present invention are directed to algorithms that improve the functioning of a basic processing function of the computer system itself, e.g., in processing transactions with predictable response times. Note that the graph 700 shows a magnified portion of the response time of graph 600, such that the same time scales and the plots of response time are identical.

Figure 8:
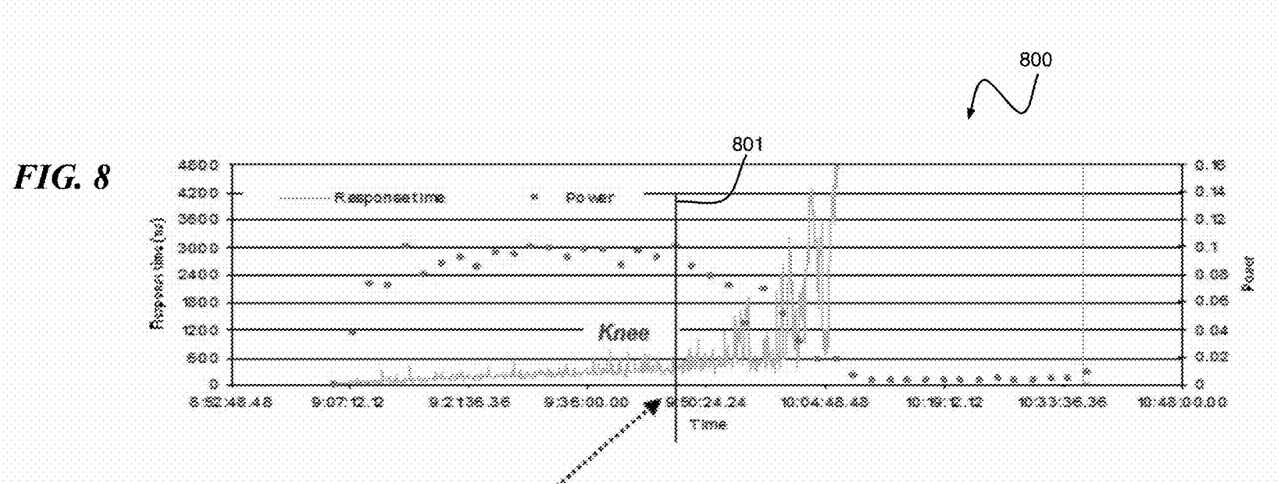
FIG. 8 shows a graph of the response time and power according to an embodiment of the present invention.
Figure 9:
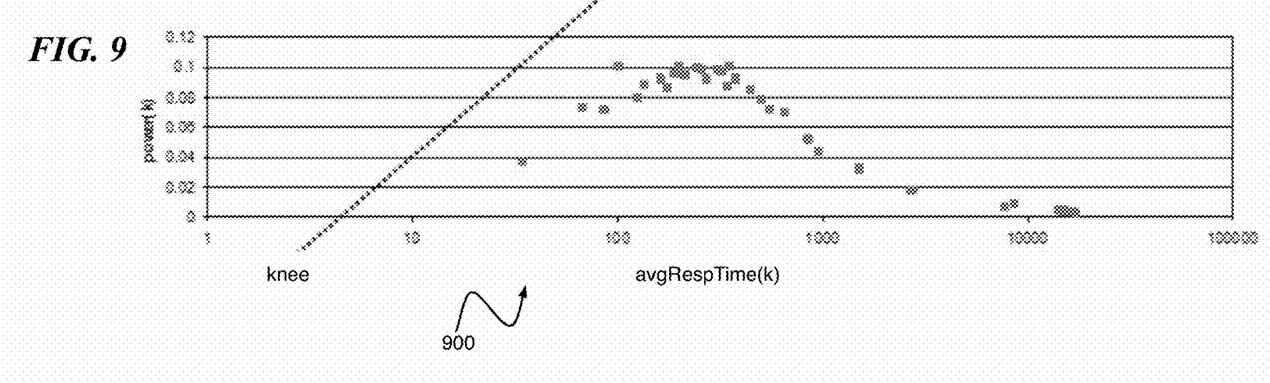
FIG. 9 shows a graph of power and average response time according to an embodiment of the present invention.

FIG. 8 shows a graph 800 of the response time and power according to an embodiment of the present invention. FIG. 9 shows a graph 900 of power and average response time according to an embodiment of the present invention. In FIG. 8, the knee 801 of the response time curve is a point beyond which an increase in throughput is small and the response time increases rapidly with load. The knee 801 is approximately the point where power of the application is at a maximum. As such, embodiments of the present invention are directed to algorithms that improve the functioning of a basic processing function of the computer system itself, e.g., in ensuring that an available processing power is maintain in a high state (e.g., at or near a maximum, e.g., within about 10 percent of a theoretical maximum).

Figure 10:
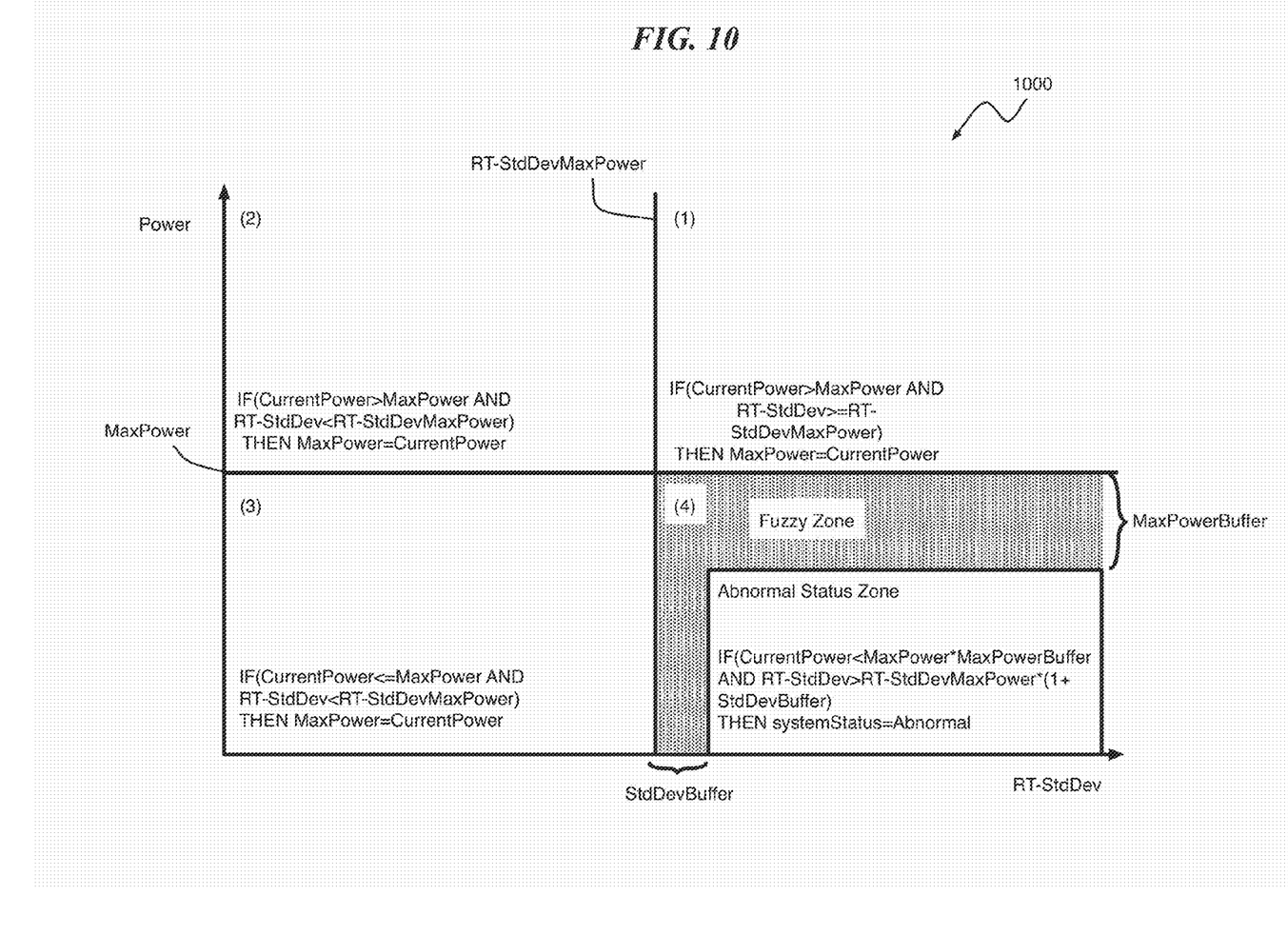
FIG. 10 shows logic states for application abnormality detection according to an embodiment of the present invention.

FIG. 10 shows logic states 1000 for application abnormality detection according to an embodiment of the present invention. In FIG. 10, the X-axis is a standard deviation of response time (RT-StdDev) and the Y-axis is power. The graph is divided into four quadrant zones (1-4).

In zone (1) and zone (2), the current power is greater than the maximum power. In these zones, requests are continuously sent. The system resources are at least sufficient so that the system performance is increasing, i.e., power is increasing with load. In zone (1) and zone (2), a maximal power is found and the system has a normal status.

In zone (3), the current power is less than or equal to the maximum power, and RT-StdDev is less than the standard deviation of response time corresponding to a time slot of the maximal power (RT-StdDevMaxPower). In this zone the requests are decreasing and system performance is falling, i.e., power is decreasing. This characteristic can lead to a false negative result (i.e., reporting an abnormal state when none exists) if using a current maximum power as a baseline. Further, a reduction in performance does not result in an abnormal status. In zone (3), the maximum power is updated, where the new value is used as a baseline, and the system has a normal status.

In zone (4), the current power is less than or equal to a maximum power and the RT-StdDev is greater than or equal to the RT-StdDevMaxPower. Zone (4) includes a fuzzy zone, wherein the number of requests is increasing, system resources are highly used, and the system is still in a normal status, while handling requests more slowly. The fuzzy zone is defined by factors including a buffer of maximal power (MaxPowerBuffer) and a buffer of standard deviation (StdDevBuffer), wherein the system has a normal status. Zone (4) further includes an abnormal status zone in which the system resources are fully used and one or more requests have failed and the system has an abnormal status. As a result the system sends a notification that the status is, or has become, abnormal.

As can be seen in FIG. 10, the buffers (i.e., MaxPowerBuffer and StdDevBuffer) are the portions of Zone (4) that exist between the abnormal status zone, with its own defined parameters and Zones (1) and (3), each with their own defined parameters. As such, in at least one embodiment of the present invention, there is no need for a user to define the buffers.

By way of recapitulation, an automatic method for detecting system bottleneck based on throughput and response time includes collecting data indicating how throughput and response time vary with time, calculating power on the fly and recording a maximal power, calculating the standard deviation of response time (RT-StdDev), and recording the standard deviation of response time corresponding to a time slot of the maximal power (RT-StdDevMaxPower), and when Power<MaxPower and RT-StdDev>RT-StdDevMax-Power, generating a notification that the system is in bottleneck.

In at least one embodiment of the present invention, to make the bottleneck confirmation with high confidence, a fuzzy zone is established based on two parameters: the MaxPowerBuffer and the StdDevBuffer. In this case, the abnormality is detected when a Current Power is less than a MaxPower times MaxPowerBuffer and RT-StdDev is greater than RT-StdDevMaxPower times (1+StdDevBuffer). According to an embodiment of the present invention, the bottleneck confirmation is performed at block 404 of FIG. 4. Upon confirming the bottleneck, the system sets a value congestionID(k) to 1 at block 406, which triggers a notification at 407, otherwise, in a normal state, the system sets congestionID(k) to 0 at block 405 and the system continues to collect throughput and response time data at block 401.

Figure 11:
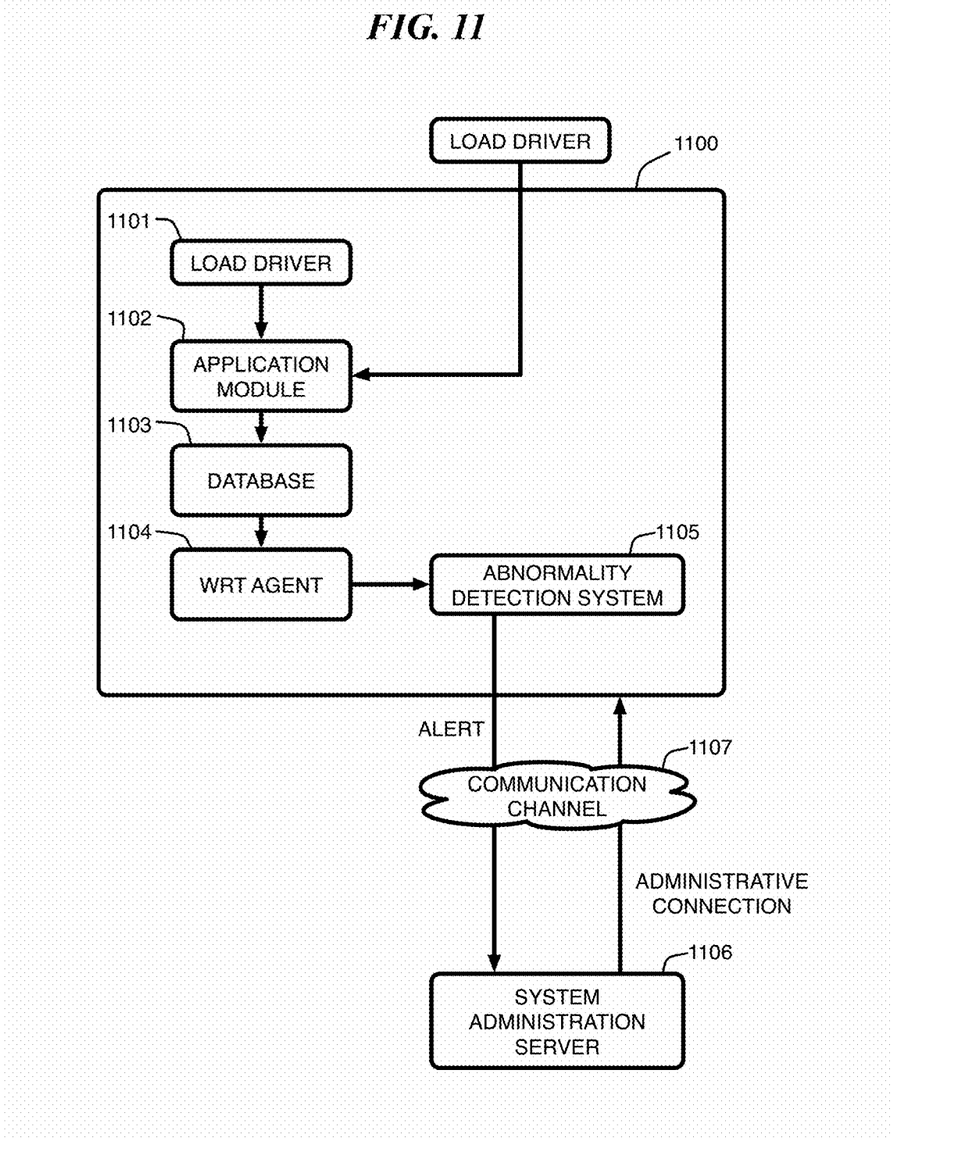
FIG. 11 is an block diagram depicting an exemplary computer system having an abnormality detection system according to an embodiment of the present invention.

Referring to FIG. 4 and FIG. 11, a computer system 1100 configured according to an embodiment of the present invention includes an application module 1102 embodied in computer executable code for performing a process (e.g., an application built on an asynchronous event driven framework such as NODE.JS) and database 1103 (e.g., a storage engine such as MONGODB). A Web Response Time (WRT) agent 1104 collects throughput and response time data. A load driver 1101 adds workload to the computer system and generates a bottleneck in the computer system at the application module 1102. It should be understood that the load driver 1104 is a source of workload from the operation of the computer system 1100. It should be understood that the load source can be from within the computer system or an external source. An abnormality detection system 1105 of the computer system is configured to detect an abnormal state. The abnormality detection system 1105 receives the throughput and response time data from the WRT agent 1104. The abnormality detection system 1105 filters noise and calculates an average throughput, an average response time, a current power, and a RT-StdDev. The average throughput, average response time, power, and RT-StdDev can be used in connection with the classification method shown in FIG. 10. Upon the abnormality detection system 1105 detecting that the computer system is operating in zone (4), the abnormality detection system 1105 generates an alert (in FIG. 4, an index congestionID is set to "1" at block 106).

In at least one example, the alert is transmitted over a communication channel (e.g., the Internet) to a device associated with the computer system 1100, such as a system administration server 1106, wherein the alert activates an administration application to cause the alert to be displayed on the system administration server and to enable a connection to the computer system 1100 over the communication channel 1107 (e.g., remote-access via a virtual private network (VPN) connection). In at least another example, the alert is indicative of a bottleneck, such as a transaction appearing in the database and causing an error. In at least one embodiment, the alert is used to predict the performance of a system, for example, a level of performance can be determined based on a rate at which alerts are generated, for example, when more than a threshold number of alerts are generated within a given time period, the system engages an automatic repair of transaction performance, e.g., before the performance degradation can be perceived by a user. In at least one embodiment of the present invention, the alert causes the system to search for an upgrade, for example, if a system component causes alerts to be generated at a rate greater than a threshold, then the system searches for an upgrade in the form of additional processing resources, or an alternative to the system component causing the alerts (e.g., moving the application to a more powerful server).

It should be understood that the embodiments described herein are scalable for different environments including computer applications, computer servers, cloud environments, etc.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system having abnormality detection capabilities. Further, a computer program product can include a tangible computer-readable recordable storage medium with code adapted to be executed to carry out one or more method steps described herein, including the provision of the system with the distinct software modules.

Figure 12:
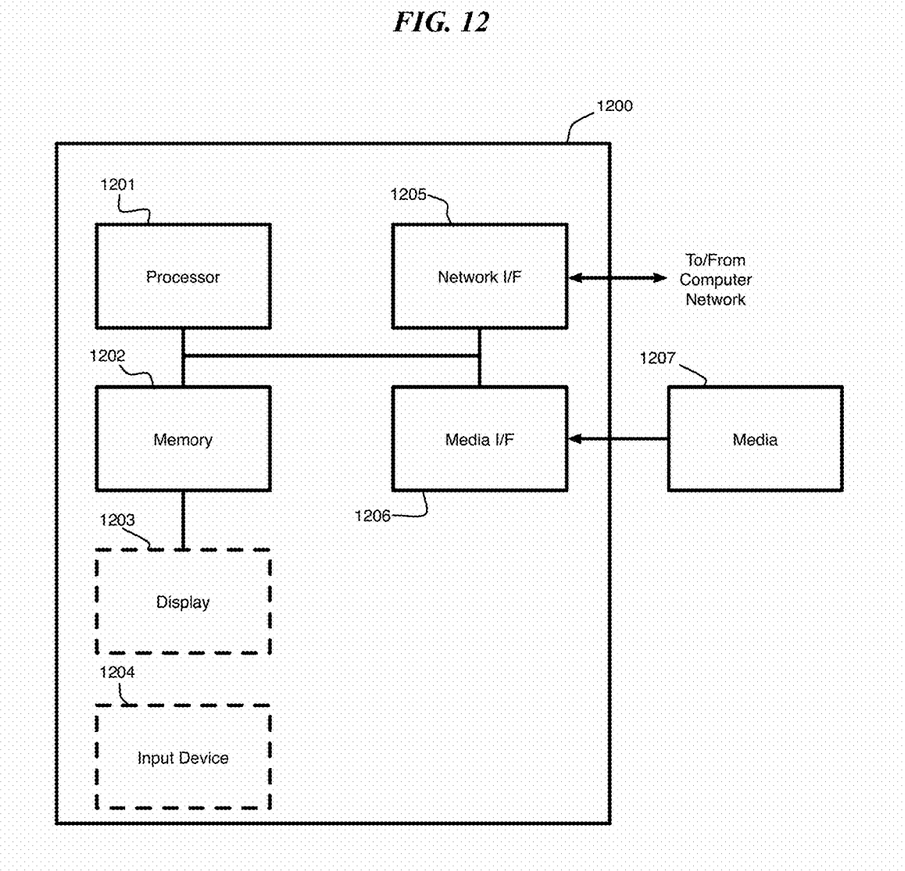
FIG. 12 is a block diagram depicting an exemplary computer system embodying a method for application abnormality detection according to an embodiment of the present invention.

Referring to FIG. 12; FIG. 12 is a block diagram depicting an exemplary computer system embodying the abnormality detection methods (see FIG. 4) according to an embodiment of the present invention. The computer system shown in FIG. 12 includes a processor 1201, memory 1202, display 1203, input device 1204 (e.g., keyboard), a network interface (I/F) 1205, a media I/F 1206, and media 1207, such as a signal source, e.g., camera, Hard Drive (HD), external memory device, etc.

In different applications, some of the components shown in FIG. 12 can be omitted. The whole system shown in FIG. 12 is controlled by computer readable instructions, which are generally stored in the media 1207. The software can be downloaded from a network (not shown in the figures), stored in the media 1207. Alternatively, software downloaded from a network can be loaded into the memory 1202 and executed by the processor 1201 so as to complete the function determined by the software.

The processor 1201 may be configured to perform one or more methodologies described in the present disclosure, illustrative embodiments of which are shown in the above figures and described herein. Embodiments of the present invention can be implemented as a routine that is stored in memory 1202 and executed by the processor 1201 to process the signal from the media 1207. As such, the computer system is a general-purpose computer system that becomes a specific purpose computer system when executing routines of the present disclosure.

Although the computer system described in FIG. 9 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of operating a computer system comprising:
collecting, from the computer system, data indicative of variations in throughput and response time over a period of time;
calculating processing power of the computer system over the period of time;
recording a maximal power;
calculating a standard deviation of the response time (RT-StdDev);
recording the standard deviation of the response time corresponding to a time of the maximal power (RT-StdDevMaxPower); and
generating a notification that the computer system is in a bottleneck state using a comparison of a current processing power to the maximal power and a comparison of the RT-StdDev to the RT-StdDevMaxPower.

2. The method of claim 1, further comprising confirming, before generating the notification, the bottleneck state using a buffer of the maximal power (MaxPowerBuffer) and a buffer of standard deviation of response time (StdDevBuffer) and generating the notification upon determining that the current processing power is less than the maximal power multiplied by the MaxPowerBuffer and that the RT-StdDev is greater than the RT-StdDevMaxPower multiplied by a sum of 1 and the StdDevBuffer.

3. The method of claim 1, further comprising transmitting the notification over a communication channel to an administration server associated with the computer system, wherein the notification activates an administration application to cause the notification to be displayed on the administration server and to enable a connection from the administration server to the computer system over the communication channel.

4. The method of claim 1, wherein the method is performed iteratively.

5. The method of claim 1, further comprising performing a subsequent comparison of a subsequent current processing power to the maximal power and a subsequent comparison of the RT-StdDev to the RT-StdDevMaxPower in determining a normal state, wherein no notification is generated.

6. A computer program product for operating a computer system, the computer program product comprising a computer readable storage medium having program instructions embodied therewith, the program instructions executable by a processor to cause the processor to:
collect, from the computer system, data indicative of variations in throughput and response time over a period of time;
calculate processing power of the computer system over the period of time;
record a maximal power;
calculate a standard deviation of the response time (RT-StdDev);
record the standard deviation of the response time corresponding to a time of the maximal power (RT-StdDevMaxPower); and
generate a notification that the computer system is in a bottleneck state using a comparison of a current processing power to the maximal power and a comparison of the RT-StdDev to the RT-StdDevMaxPower.

7. The computer program product of claim 6, further comprising the program instructions executable by the processor to cause the processor to confirm, before generating the notification, the bottleneck state using a buffer of the maximal power (MaxPowerBuffer) and a buffer of standard deviation of response time (StdDevBuffer) and generating the notification upon determining that the current processing power is less than the maximal power multiplied by the MaxPowerBuffer and that the RT-StdDev is greater than the RT-StdDevMaxPower multiplied by a sum of 1 and the StdDevBuffer.

8. The computer program product of claim 6, further comprising the program instructions executable by the processor to cause the processor to transmit the notification over a communication channel to an administration server associated with the computer system, wherein the notification activates an administration application to cause the notification to be displayed on the administration server and to enable a connection from the administration server to the computer system over the communication channel.

9. The computer program product of claim 6, further comprising iteratively executing the program instructions by the processor.

10. The computer program product of claim 6, further comprising performing a subsequent comparison of a subsequent current processing power to the maximal power and a subsequent comparison of the RT-StdDev to the RT-StdDevMaxPower in determining a normal state, wherein no notification is generated.

11. A computer system comprising:
a load driver generating a workload;
an application module embodied in computer executable code executed by a processor of the computer system and processing the workload;
an agent collecting throughput and response time data about the computer system executing the application module and processing the workload; and
an abnormality detection system detecting an abnormal state of the computer system executing the application module and processing the workload, wherein the abnormality detection system receives the throughput and response time data from the agent and determines a notification by calculating an average throughput, an average response time, a current power, and a filtered response time.

12. The computer system of claim 11, wherein the abnormality detection system transmits the notification over a communication channel to an administration server associated with the computer system, wherein the notification activates an administration application to cause the notification to be displayed on the administration server and to enable a connection from the administration server to the computer system over the communication channel.

13. The computer system of claim 11, wherein the abnormality detection system transmits the notification upon determining a plurality of abnormal states of the computer system at a rate greater than a threshold over time.

* * * * *